United States Patent

Van Deurzen et al.

Patent Number: 5,815,643
Date of Patent: Sep. 29, 1998

[54] PRINTING SYSTEM

[75] Inventors: Hendrikus J. G. Van Deurzen, Budel; Gerardus J. M. Geurts, Kronenberg; Wilhelmus H. M. Orbons, Grubbenvorst; Jurek N. Deen, Venlo, all of Netherlands

[73] Assignee: Oce-Nederland, B.V., MA Venlo, Netherlands

[21] Appl. No.: 569,993

[22] Filed: Dec. 8, 1995

[30] Foreign Application Priority Data

Dec. 9, 1994 [NL] Netherlands ........................... 9402088
Jul. 3, 1995 [NL] Netherlands ........................... 1000719

[51] Int. Cl.[6] .............................. B41B 15/00; G06K 9/20; H04M 11/00; G03G 15/00
[52] U.S. Cl. .......................... 395/112; 395/101; 382/317; 379/100.07; 399/82; 399/83; 399/85; 358/296; 358/401
[58] Field of Search .................................... 395/112, 114, 395/115, 116, 101; 399/83, 82, 85; 358/468, 296, 401, 434, 435, 436, 438, 439; 382/317; 379/100.07

[56] References Cited

U.S. PATENT DOCUMENTS

| 4,460,975 | 7/1984 | Torkelsen et al. | 364/900 |
| 5,079,723 | 1/1992 | Herceg et al. | 395/156 |
| 5,179,637 | 1/1993 | Nardozzi | 395/114 |
| 5,262,851 | 11/1993 | Nakatani et al. | 358/500 |

FOREIGN PATENT DOCUMENTS

| 618529 | 10/1994 | European Pat. Off. . |
| 1531401 | 11/1978 | United Kingdom . |

Primary Examiner—Kim Yen Vu
Assistant Examiner—Kimberly A. Williams
Attorney, Agent, or Firm—Birch, Stewart, Kolasch & Birch, LLP

[57] ABSTRACT

A system for repeatedly processing, in a production run, a set of original images to form at least two disparate sets of copies of the originals in accordance with a job specification, the job specification including at least two disparate copy set specifications corresponding to the two disparate copy sets to be formed. The system produces the required disparate copy sets, each in accordance with its own copy set specification, independently of an operator's intervention.

26 Claims, 6 Drawing Sheets

Fig. 4A

| Ready to copy | | Machine | Program | Finishing | Copy |
|---|---|---|---|---|---|
| | | | Store ⇔ | | |
| normal | fold | | | | |
| stack | belt 1 | | | | |
| 100% | - | | | | |
| roll 1 | - | | | | |
| sortby page | sortby set | | | | |
| copies 1 | copies 7 | | | | |
| Default settings | 1 | 2 | 3 | 4 | 5 |

Fig. 4B

| Ready to copy | | | Machine | Program | Finishing | Copy |
|---|---|---|---|---|---|---|
| | | | | Matrix ⇔ | | |
| normal | fold | fold | fold | | | |
| stack | belt 1 | belt 2 | - | - | | |
| 100% | - | 71% | - | - | | |
| roll 1 | - | roll 2 | roll 4 | roll 3 | | |
| sortby page | sortby set | sortby set | sortby page | sortby set | | |
| copies 1 | copies 7 | copies 2 | copies 5 | copies 2 | | |
| Default settings | 1 | 2 | 3 | 4 | 5 |

PRINTING SYSTEM

BACKGROUND OF THE INVENTION

1. Technical Field of the Invention

The invention relates to a printing system for processing a set of original images into a copy set for a production run in accordance with a copy set specification.

2. Description of the Related Art

It is known to process a set of original images in accordance with a copy set specification. The printing system is programmed in the required manner, i.e., the required settings are input in order to instruct the machine how to process the copy set specification. Original images are input. Then in a production run, the original images are processed in accordance with the settings made, to give a required set of prints/copies from the set of original images.

One of the system settings relates to the number of copies N required from an original image. If N=1 and if there are M original images, then M prints are formed, each a print of each original image, and it should be noted that each print is formed to the same system settings, i.e., to the same copy set specification.

If the set of M original images is to be printed more than once, that results in M×N prints. These prints can be delivered unsorted, a complete set being formed successively from N prints of the first original image, N prints of the second original image, and so on up to and including N prints of the $M^{th}$ original image, or they can be delivered in sorted form. In the latter case, the complete set consists of N collated sets each consisting of M prints, a print of each original. Here again it should be noted that each print is made in accordance with the same system settings, i.e., according to the same copy set specification. This means, for example, that in the case of the complete set consisting of N collated sets, these N sets will all be identical. With the printing systems known from the prior art, e.g., as described in UK 1 531 401 in the name of Davey and Simonds, the total copy set formed will in such a case consist of a number of sets which are all identical because they are all printed in accordance with the one copy set specification.

U.S. Pat. No. 5,079,723, to Herceg and Perey, discloses allowing one or more pages in a copy set specification to be printed in a different form from the others. However, if several sets are required in such a case, then the copy sets for delivery will also all be identical. Take the example that 4 copy sets have to be formed from an original set consisting of 5 originals. The 5,079,723 patent describes programming means to specify that, e.g., the third page has to be processed in another way than the remaining pages. Suppose that the user decides that the third page has to be printed on a red sheet. Then the processing of the job results in the delivery of 4 copysets, with the third page of each copy set being printed on a red sheet. Yet all delivered copy sets are identical.

In many cases it will be true that the required copy sets are intended for several departments or individuals. However, if the addressees each want a copy set formed in a different way, e.g., enlarged or reduced, offset or otherwise, or on different copy media, then this is possible with the prior art printing systems only by processing the set of originals a number of times, the settings being changed manually each time in order to give the required copy set each time. This is extremely tedious for the printing system operator. If the printing system is a copying machine, the original sets will have to be read in again each time and the correct settings made each time. If the printing system is a printer, than a plurality of copy set specifications will have to be sent to the printer. This is undesirable particularly in production environments. There is a need to be able to form different copy sets from one another in one single operation from one set of original images.

SUMMARY OF THE INVENTION

An object of this invention is to meet the need discussed above. This object, and others, are fulfilled by providing a printing system for processing a set of original images into at least two disparate sets of copies thereof during a production run in accordance with a job specification, the job specification including at least two disparate copy set specifications, the printing system comprising: storage means for storing a set of original images supplied to the printing system; programming means for programming the printing system in accordance with a job specification; and control means for repeatedly processing, during a production run, one and the same set of original images according to the job specification to produce the at least two disparate copy sets corresponding to the copy set specifications of the job specification.

Consequently, instead of it being necessary for the operator to carry out several jobs in order to be able to form different copy sets from one and the same set of original images, a job is defined for the production of all various copy sets. As such, a job dictates processing the original set into a first copy set in accordance with a first copy set specification, then processing the original set into a second copy set in accordance with a second copy set specification, and so on, until all the required copy sets have been formed. This is an advantage because the operator in a production environment is not compelled to start a new job for each new copy set specification concerning the same original images. Also, in this way jobs which (in view of the different requirements applied) do not really fit into a production environment, the size of the run being a primary consideration, can be made suitable for processing in such a production environment. While maintaining the run, specialist copy sets can be formed which otherwise would have to be produced in a labor-intensive process.

Programming such jobs can be effected in various ways. In a first variant of the invention, the printing system can include means for preprogramming a series of copy set specifications, memory means for storing the series of copy set specifications, and recall means for activating the preprogrammed series for repeated printing of the set of original images, each printing in accordance with a copy set specification from the recalled series.

For this purpose the printing system gives the operator means for setting a number of copy set specifications and performing these copy set specifications all in one production run, without the operator's intervention, on one and the same set of original images. As a result, the printing system is capable of delivering the required copy sets, each in accordance with its own copy set specification, quite independently without an operator's intervention.

In a second variant of the invention, to this end, the printing system includes means for allocating parameter specifications to print parameters and means for specifying, for at least one print parameter, a series of parameter specifications, each parameter specification of the series relating to another copy set required.

This is advantageous for the rapid programming of a job. With suitable parameters for the purpose, the user has the opportunity of setting the parameter for each required copy set. This is advantageous if only a few parameters have to be changed per copy set.

This is especially advantageous if there is only one parameter that has to be changed, and said one relates to the number of prints, including zero, to be formed for each individual copy set from the respective original images from the original set. In many cases, the copy sets will be printed, for example, for different individuals jointly working on a project. The original set, for example, will be all the drawings which should be associated with this project. The individuals concerned, for each of whom a copy set is intended, will each have his own task and responsibility within such a project. This means that not all the drawings are relevant to all the individuals. The measures according to the invention make it possible to indicate for each copy set what prints of the original images should be included in the set.

In another embodiment of the printing system according to the invention, the printing system comprises an operator interface for inputting copy set specifications comprising display means for displaying in matrix form the relationships between original images and the copy images required. The display means displays the relationships in such a manner that original images are indicated along a first axis of the matrix and copy sets are indicated along a second axis of the matrix and, in a cell of the matrix, the number of required copy images of the original image belonging to the cell, for the copy set belonging to the cell are indicated. This measure according to the invention allows simple and readily apparent operation, particularly if different programming is required for each original image.

Advantageously, receiving means for supplying a set of original images and the specification inputting means are implemented as data receiving means adapted for connection to a data network.

In one specific embodiment of a printing system according to the invention, the receiving means for supplying a set of original images to the printing system are implemented as a scanner for converting a set of original images on a carrier into a set of electronic original images. In this circumstance, the programming means are comprised by an operator interface.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and, thus, are not limitative of the present invention, and wherein:

FIGS. 4A and 4B show a first and second operating screen; and

DETAILED DESCRIPTIONS OF THE PREFERRED EMBODIMENTS

A "print job," or simply a "job," refers to the processing necessary to be done on a set of original images to form all the required copies. A job can be defined by a job specification, although this is not necessary. A job specification includes at least one copy set specification, and usually a plurality of disparate copy set specifications. A copy set specification defines a set of copies, i.e., a copy set, that are to be made of the original images.

Figure 1:
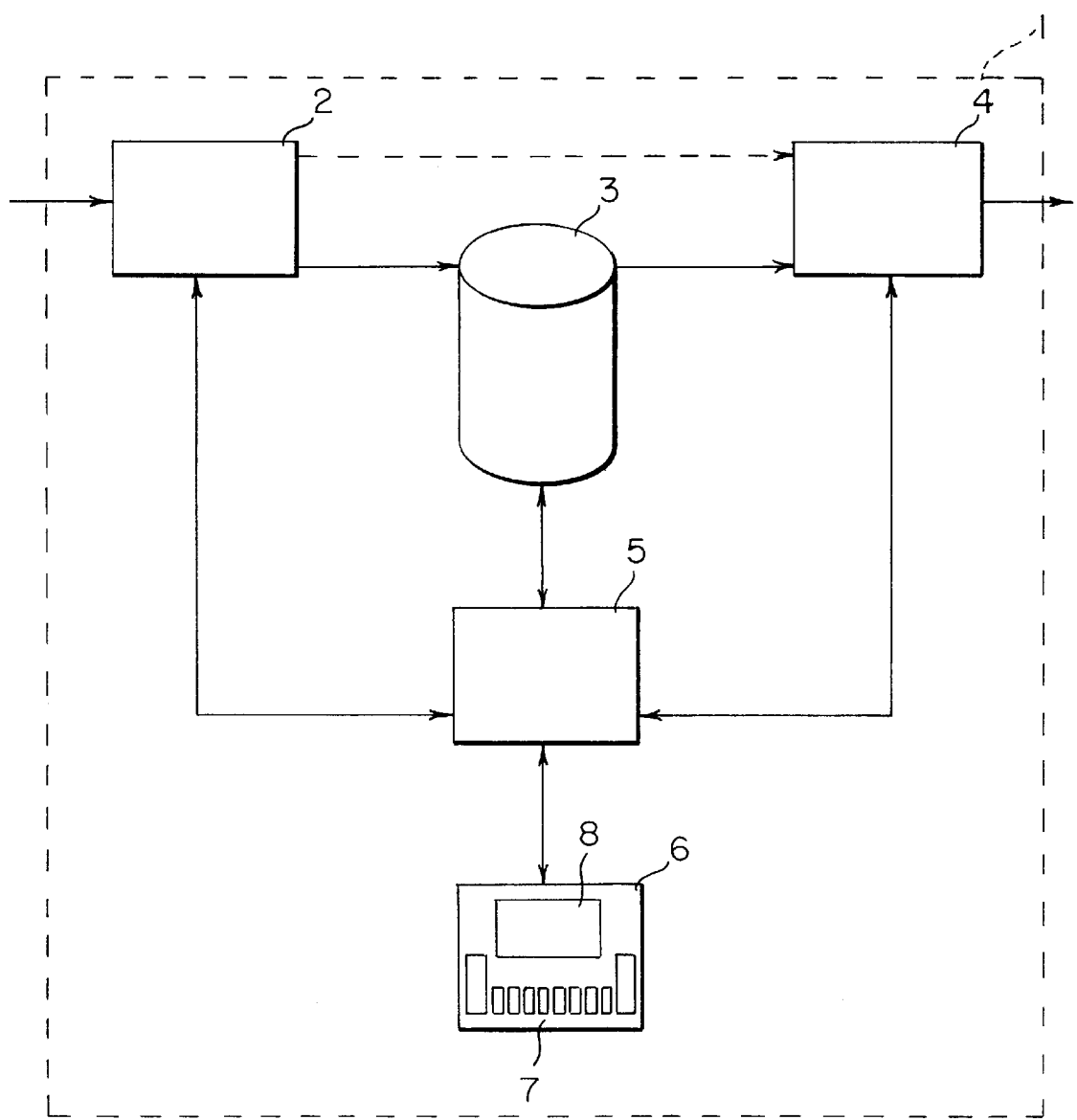
FIG. 1 is a diagram showing a printing system according to the invention.

FIG. 1 diagrammatically illustrates a printing system 1 according to the invention. The printing system comprises an input device 2 for the supply of a print job, a memory 3 for storing print jobs and a printer 4 for printing print jobs stored in the memory 3.

A controller 5 provides for selection of print jobs from the memory 3 and their supply to the printer 4, where they are processed in accordance with the accompanying job specification. Operating interface 6 is connected to the controller 5 and preferably includes a number of keys 7 and a display unit 8. A job specification can be input via the input device 2 and via the operating interface 6. The input device 2 comprises both a scanner (not shown) for reading in paper originals and an external data interface (not shown) for receiving electronic originals. The printer 4 includes a page description language interpreter whereby electronic original images coded in accordance with a given data format, e.g., ASCII or a page description language such as Postscript, can be converted to one or more bitmaps suitable for printing. The printer 4 can also include memory and an interface, e.g., to connect to a network.

The printing system comprises a direct and an indirect copying function. In the case of the indirect copying function, the user makes the required settings via the operating interface 6 in accordance with the way in which a print job is to be processed, whereafter the paper originals associated with the job are scanned in. The resulting electronic original images associated with the job and the settings made, which form part of the job set specification, are stored in the memory 3. If the print job is next for further processing, then the electronic original images and the associated job specification are transmitted to the printer 4, which further ensures that prints are made in accordance with the job specification. In the case of the direct copying function, the original images input are fed directly to the printer 4 without a job specification being generated. There is no storage in the memory 3.

The printing system also comprises a printer function. Print jobs, with or without a job specification, are received via the input device 2, which is connected to a data network for example, and are stored in the memory 3. Via the operating interface 6, it is possible to change the job specification, provided that the job is still in the memory 3. Further treatment is identical to the above-described processing of a job.

The printing system also comprises a hybrid function, in which a job is made up of original images originating from the scanner and original images supplied via the external data interface.

Figure 2:
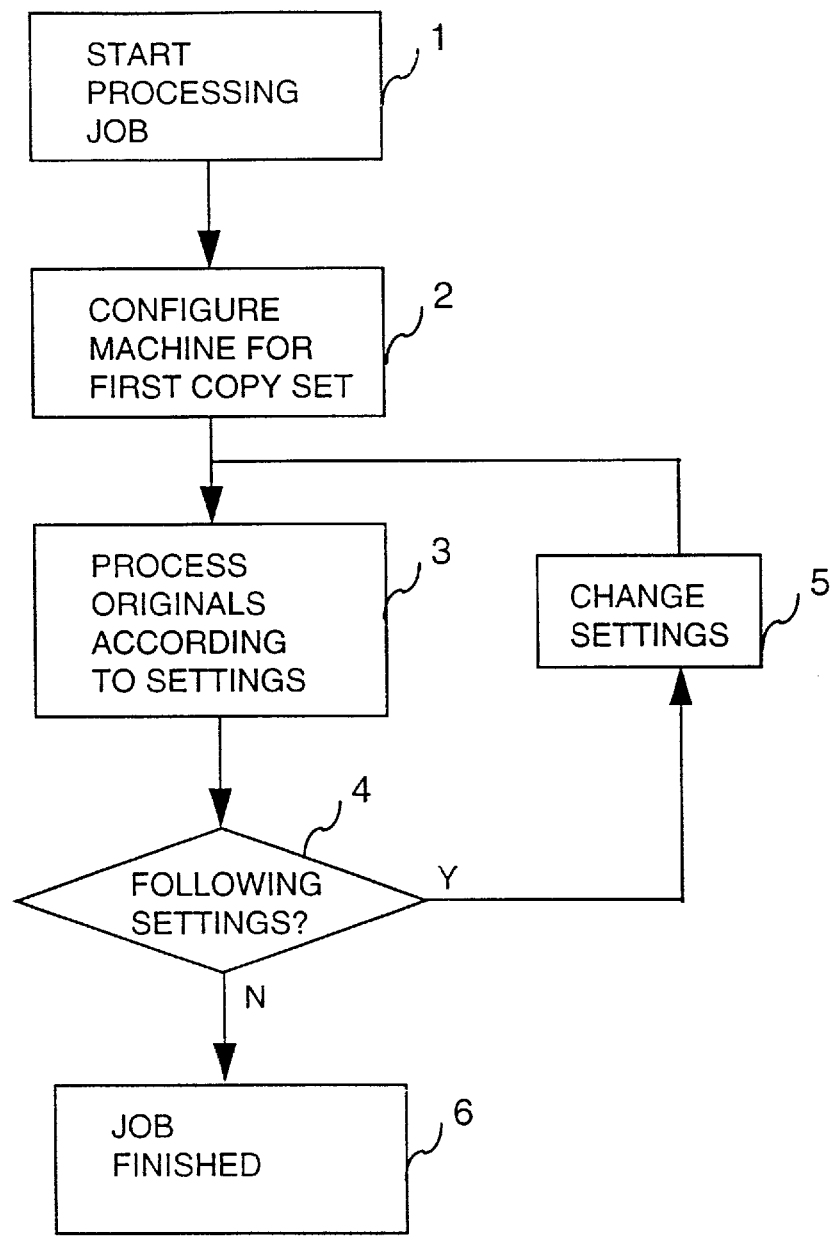
FIG. 2 shows the mode of operation of the system by reference to a flow diagram.

The mode of operation of the printing system will now be explained with reference to the flow diagram of FIG. 2. The set of originals is read in step 1 and copy set specifications, of which the job specification is formed, are input to a program buffer. In step 2 the controller 5 ensures that the printer 4 is set according to the specifications for forming the first copy set. Processing of the original set in accordance with the first copy set specification then takes place in step 3, and this provides a first copy set for delivery. In step 4 a check is made whether a next copy set has to be formed according to a next copy set specification. If so (Y), then in step 5 the control unit ensures that the printer 4 is adjusted in accordance with the copy set specification. Step 3 is then carried out again, a following copy set being formed in accordance with the amended printer settings. If it is found in step 4 that there are no following copy set specifications defined, then the job is completely finished and end stage 6 is reached.

By processing a print job in accordance with the invention, the printing system can deliver the required copy sets, each in accordance with its own copy set specification, quite independently without the intervention of an operator. As a result, automatic operation of such a system when used in the copying function and in the hybrid function is improved to a far-reaching degree, while in the print function efficiency is improved in that only one print job is required.

A first and second embodiment of the invention will now be explained with reference to FIG. 3.

Figure 3:
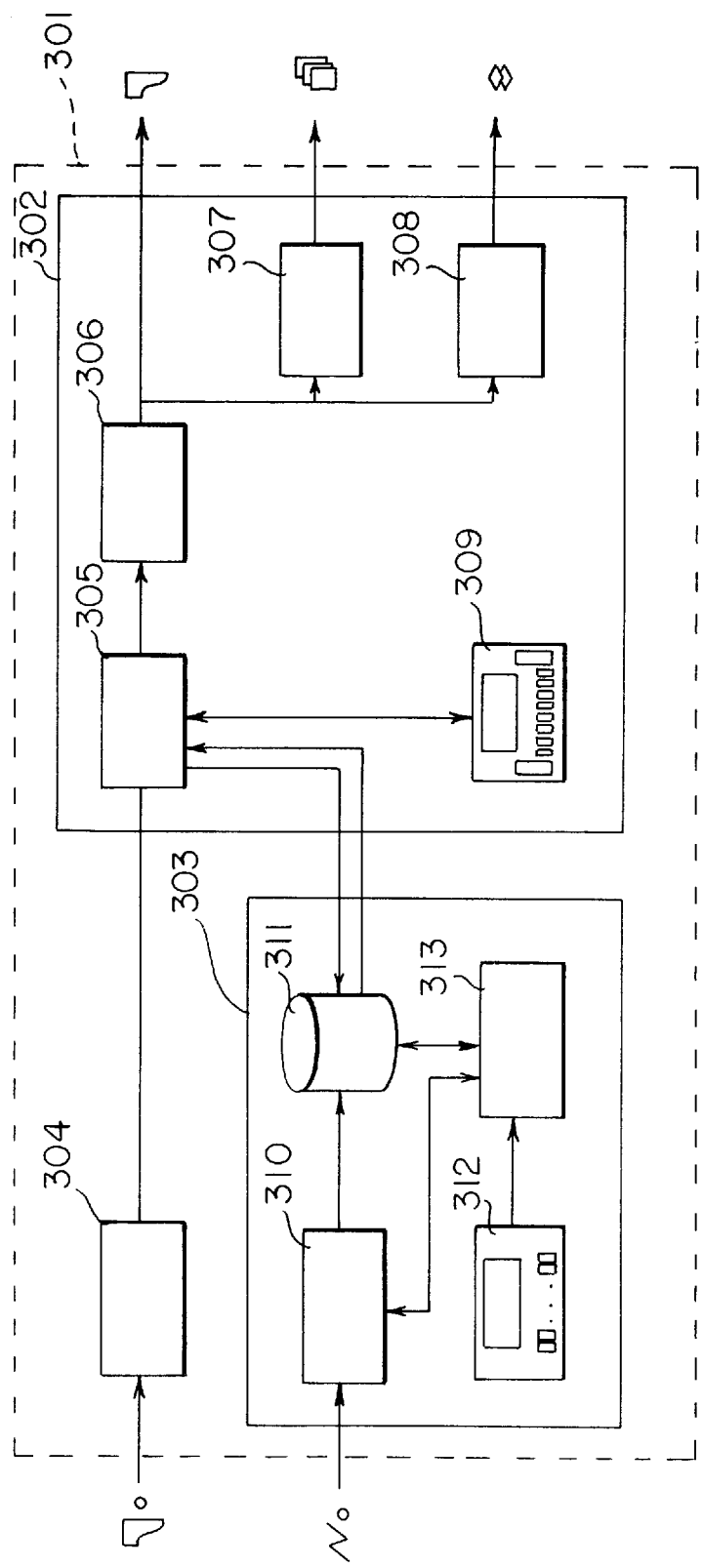
FIG. 3 illustrates one embodiment of the printing system.

FIG. 3 shows a variant of the printing system in which the printing system 301 comprises three units connected by data communication lines, a print station 302, a control station 303 and a scanner 304, respectively.

The print station comprises a controller 305, an engine 306, a number of finishing units, e.g. a sorting device 307 and a folder 308, and an operating interface 309.

The control station 303, which is in the form of a personal computer for example, comprises an external data interface 310 for connection to a data network, facsimile network and/or for connection to a host computer, a memory 311 for storing print jobs, in the form of a hard disc and/or minidisc (md) system; an operating interface 312, which includes a keyboard, a video display unit ("VDU") and a mouse; and a processor 313, which is so instructed (or programmed) that required functions are performed. Optionally, the control station 303 may also comprise a CD-ROM, so that a user has the possibility of including in a print job the data stored thereon.

The scanner 304 is, for example, in the form of a page scanner with a moving flat plate, a page scanner through which the page is passed, or a microfilm scanner.

The scanner 304 and print station 302 are adapted to co-operate without the intervention of the control unit 303 and then form a digital copying machine.

The printing system 301 is provided with a function for scanning in and subsequent storage in the memory 311 of a number of originals, whereafter these originals are then available in electronic form for inclusion in a print job.

Print jobs arrive via the external data interface 310 from a host computer or via a data network. These print jobs are also stored in the memory 311.

A first embodiment of the invention will be explained by reference to the copying function. In this example, the user uses the printing system via the operating interface 309. The latter comprises an LCD screen and a number of keys. Operating screens are displayed on the LCD screen. Choices in these screens are made by using the keys positioned around the LCD screen. Keys are also provided for directly setting specific functions. A first embodiment of the invention will be explained further by reference to the operating screens shown in FIG. 4.

The printing system is programmed by making the required settings via the keys or via menus on the LCD screen of the operating interface 309. A print job is specified by a job specification, which usually includes a plurality of copy set specifications. A copy set specification, specifying the way in which a copy set has to be formed from a set of original images, comprises a number of parameters each determining a specific aspect of the job. Examples of such parameters are the number of copies ('copies'), degree of enlargement (zoom percentage), copy media ('roll'), folding ('normal' or 'fold'), delivery station ('stack'), stapling, reinforcement, perforation, gluing, binding, laminating, and so on. All of these parameters can be set via the operating interface 309. Once the machine has been set as required, then the user next selects the 'program' menu. This situation is depicted in FIG. 4A, where the user has just entered parameters for a copy set specification.

In FIG. 4A, the leftmost column of the screen shows default values. The adjacent column, labeled with program number '1' shows the settings made by the user. After selection of the 'program' menu, the user is given the options 'store', 'erase', 'load' and 'matrix'. The user selects the option 'store' so that the settings made are stored under a program number, in this case under program number '1'. After the user has defined a number of these programs in the same way and stored them, he selects the option 'matrix' (FIG. 4B). The user now selects a number of the stored programs. Selection of a program is visible by the program number being reproduced in inverted form. After selection, the user inputs the set of originals to the scanner and activates the starting button. The printing system then processes the print job by successively performing the selected programs, corresponding to copy set specifications, on the read-in set of original images.

To program a print job according to the invention there is no need to input copy set specifications afresh each time. It is possible that a number of frequently used programs will be stored for long periods. To program a job according to the invention, all that is then required is to make a selection from the stored programs, thus resulting in the series of copy set specifications required.

A second embodiment of the invention will be explained by reference to the printer function. In the present example, the operator now controls the printing system via the control station 303.

FIG. 5 shows two operating screens relating to a copy set specification to the extent that this is displayed to the operator. These screens may be recalled at different places of the menu and give the operator the possibility of changing the copy set specification. The "Job Specification" screen indicated by reference 501 comprises three sub-screens "Job Settings" (502), "Files in Job" (503) and "File Settings" (504).

The sub-screen "Files in Job" 503 indicates what files form part of the job and in what sequence. A file comprises one or more original images which may or may not be encoded according to a specified data format. The operator has the possibility of adding, removing and moving files. The sub-screen "File Settings" 504 displays a number of properties of a file selected in sub-screen 503, e.g. memory location, name and data format and a number of print settings, such as copy format and copy medium. The sub-screen "Job Settings" 502 displays a number of properties of the job in settings which relate to the entire job, e.g. the number of sets required and if sorting is required and, if so, in what manner.

Figure 5A:
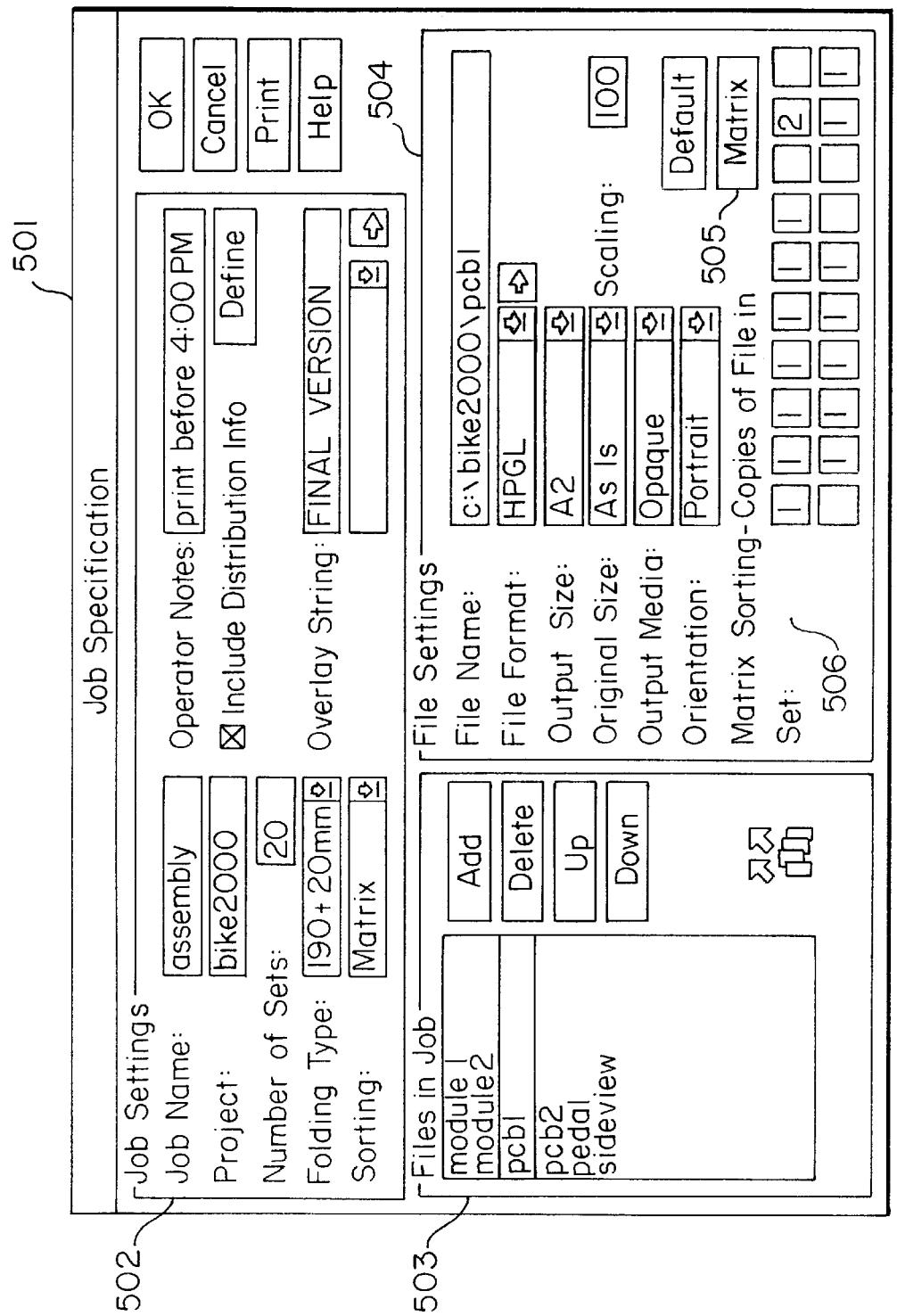
FIGS. 5A and 5B show a third and fourth operating screen.

The example illustrated in the Job Settings screen 502 of FIG. 5A shows that matrix-sorting is required. If this option is selected, then after the box 505 has been selected the screen "matrix sorting" (FIG. 5B, 507) is displayed. Matrix sorting 507 gives the user the possibility of indicating how many prints, including none, of an original image or a file (such a file resulting after interpretation in one or more original images) are to be included in each set.

A set corresponds to a single run of a job wherein the ratio of components in the job can be varied. A job includes at least one file, and a file includes at least one image. This number of prints is displayed on a cell of the matrix of which the vertical axis corresponds to one of the original images or to one of the files comprising the job and the horizontal axis corresponds to the jobs to be run.

Figure 5B:
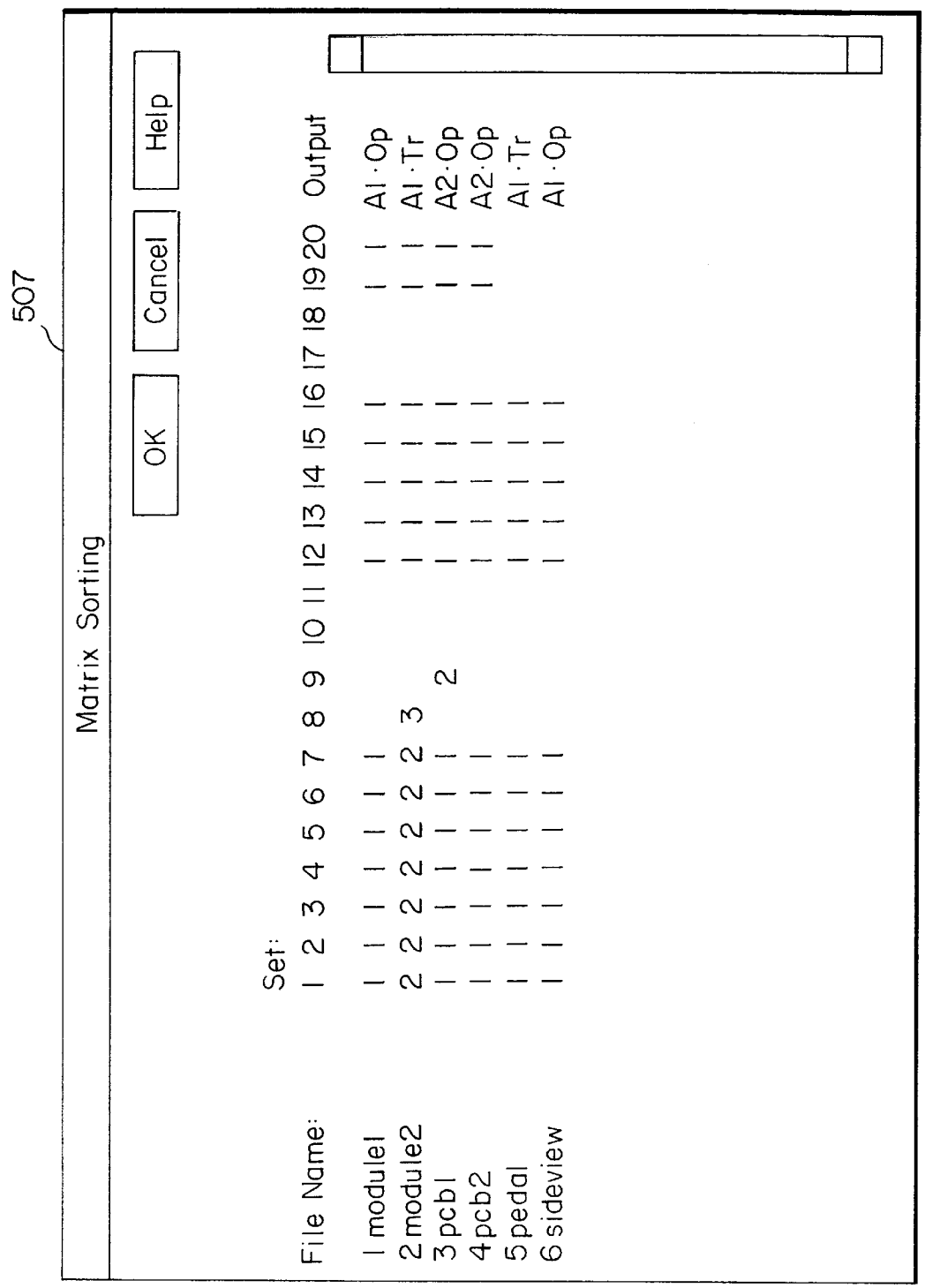

The screen illustrated in FIG. 5B, for example, shows that set 3 contains a print of the first file, two prints of the second file and a print of each of the other files. The operator has the possibility of selecting a cell and introducing a number therein. He also has the possibility of indicating for the present file in the sub-screen "Files Settings" 504, in the field "Matrix Sorting—Copies of File in Set" (FIG. 5A, 506), the number of copies to be placed in a specific set. Matrix sorting is advantageous inter alia if a number of disparate copy sets are to be made from one job, the various sets going to different clients having different interests in the composition of the copy set.

If the files in the job relate to a complex project, then a department or user concerned with safety will be interested in different files from another department responsible for the total construction.

A following variant comprises combining programming per copy set with programming per page. One embodiment with reference to FIG. 4B comprises the user pre-programming a number of jobs and defining a series of programs on inputting each original. The result is that copy sets are formed from the set of original images, whereby it is not necessary for prints of each original image to be present each time. It is also possible to allocate to each cell in the matrix of FIG. 5B a copy set specification Px. In this way it is possible, within a set for delivery, to allocate individually a copy set specification to each file for processing comprising one or more original images which may or may not be coded in a specific data format.

Other ways of inputting and recalling print job specifications are possible. In the case of a print job fed to the printing system via a data network, the person submitting the job then also has the opportunity of including references to different preprogrammed copy set specifications when sending a print job supplied to the printing system via the data input device. If a print job of this kind is processed, the set of original images will first be processed in accordance with the first copy set specification, and then in accordance with the second copy set specification, and so on, until all the copy set specifications recalled have been processed.

The sequence in which the copy set specifications are processed is not of primary significance. In one embodiment, the sequence determined by the operator or the person submitting the job is followed; in another embodiment the sequence is determined by conditions of the printing system relating, for example, to utilization, paper supply, and so on; while in another embodiment print criteria are applied to each copy set specification of the print job so that the job is processed divisionally in time, in which case for each set of print criteria the copy sets to be formed according to the permissible copy set specifications are formed until again a new set of print criteria becomes operative, in which again other copy sets according to a following number of copy set specifications of the print job are formed. In the meantime, other print jobs or parts thereof are processed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A printing system for processing a set of original images into at least two disparate copy sets thereof during a production run in accordance with a job specification, the printing system comprising:

storage means for storing the set of original images supplied to the printing system;

programming means for programming the printing system in accordance with the job specification for the production run, the job specification including the at least two copy set specifications, one copy set specification per copy set to be formed; and control means for repeatedly processing, during the production run, the set of original images according to the job specification to produce the at least two disparate copy sets corresponding to the copy set specifications of the job specification.

2. A printing system as in claim 1, further comprising:

receiving means, operatively interconnected to the memory means and the programming means, for receiving at least one of a job specification and a set of original images.

3. A printing system as in claim 2, wherein the receiving means includes:

an image scanner.

4. A printing system as in claim 2, wherein the receiving means includes:

an operator interface.

5. A printing system as in claim 2, wherein the receiving means receives from a source external to the printing system.

6. A printing system according to claim 1, wherein:

the programming means also specifies at least one print parameter value that the print parameter can take, each such value being related to another copy set that is required.

7. A printing system according to claim 6, wherein:

the at least one print parameter relates to the number of prints, including zero, to be formed for each individual copy set from the respective original images of the original set.

8. A printing system according to claim 7, further comprising:

display means for displaying in matrix form relationships between each original image and the copy images required, in such a manner that original images are indicated along a first axis of the matrix and copy sets are indicated along a second axis of the matrix;

wherein a cell of the matrix holds the number of required copy images of the original image corresponding to the cell, for the copy set corresponding to the cell.

9. A printing system as in claim 1, wherein:

the programming means includes means for preprogramming a series of copy set specifications; and wherein the printing system further includes:

memory means for storing the series of copy set specifications; and recall means for activating the preprogrammed series for the repeated printing of the set of original images, each printing in accordance with a copy set specification.

10. A printing system according to claim 1, wherein:

the programming means also program the printing system, for a particular copy set, to process at least one original image disparately from the other original images in the set thereof.

11. A printing system according to claim 10, wherein:

the programming means designates the number of copies, including zero, to be formed within the particular copyset, for at least one original image, disparately from the number of copies set for the other original images from the set thereof.

12. A printing system as in claim 1, wherein:

the original image is on paper.

13. A printing system as in claim 1, wherein:

an original image is one of text, graphics, and a combination thereof.

14. A printing system as in claim 1, wherein:

a copy set specification, C, includes at least two files, f1 and f2, in the following ratio determined by coefficients a and b: $C=\{a*f1, b*f2\}$, $a \geq 0$, $b \geq 0$, and both a and b are integers, such that a first copy set specification, $C1=\{a_1*f1, b_1*f2\}$, is different from a second copy set specification, $C2=\{a_2*f1, b_2*f2\}$, because at least one of $a_1 \neq a_2$ and $b_1 \neq b_2$.

15. A print managing method for processing a set of original images into at least two disparate sets of copies thereof during a production run in accordance with a job specification, the method comprising the steps of:

a) storing the set of original images in memory;

b) receiving the job specification, the job specification including the at least two copy set specifications, one copy set specification per copy set to be formed; and c) repeatedly processing, during the production run, the set of original images according to the job specification to produce the at least two disparate coy sets corresponding to the copy set specifications of the job specification.

16. A method as in claim 15, wherein step c) includes:

c1) processing, according to a particular copy set, at least one original image disparately from the other original images in the set thereof.

17. A method as in claim 16, wherein step c1) also includes:

designating the number of copies, including zero, to be formed within the particular copyset, for at least one original image, disparately from the number of copies set for the other original images from the set thereof.

18. A method as in claim 15, wherein:

the copy set specification includes at least one print parameter, each value that the print parameter can take being related to another copy set that is required.

19. A method as in claim 18, wherein:

the at least one print parameter relates to the number of prints, including zero, to be formed for each individual copy set of the corresponding original image from the original image set.

20. A method as in claim 15, further comprising:

d) displaying in matrix form relationships between each original image and the copies images required, in such a manner that original images are indicated along a first axis of the matrix and copy sets are indicated along a second axis of the matrix;

wherein a cell of the matrix holds the number of required copy images of the original image corresponding to the cell, for the copy set corresponding to the cell.

21. A method as in claim 15, wherein step a) further comprises:

a1) receiving the original images from at least one of an image scanner and an external source of images in memory.

22. A print managing method as in claim 15, wherein:

the original image is on paper.

23. A method as in claim 15, wherein step b) further comprises:

b1) receiving the job specification from an operator via an operator interface.

24. A print managing method as in claim 15, wherein:

an original image is one of text, graphics, and a combination thereof.

25. A method as in claim 15, wherein:

step c) includes c1) preprogramming a series of copy set specifications;

wherein the step a) includes a1) storing the preprogrammed series; and wherein the step c) also includes c2) activating the preprogrammed series for the repeated printing of the set of original images, each printing in accordance with a copy set specification.

26. A print managing method as in claim 15, wherein:

a copy set specification, C, includes at least two files, f1 and f2, in the following ratio determined by coefficients a and b: $C=\{a*f1, b*f2\}$, $a \geq 0$, $b \geq 0$, and both a and b are integers, such that a first copy set specification, $C1=\{a_1*f1, b_1*f2\}$, is different from a second copy set specification, $C2=\{a_2*f1, b_2*f2\}$, because at least one of $a_1 \neq a_2$ and $b_1 \neq b_2$.

* * * * *